(12) United States Patent
Barghouthi

(10) Patent No.: US 8,064,354 B1
(45) Date of Patent: Nov. 22, 2011

(54) OPTIMIZED PATH CALL ROUTING WITH DEVICE IDENTIFIER

(75) Inventor: Julie Barghouthi, Denver, CO (US)

(73) Assignee: IntelePeer, Inc., San Mateo, CA (US)

( * ) Notice: Subject to any disclaimer, the term of this patent is extended or adjusted under 35 U.S.C. 154(b) by 0 days.

(21) Appl. No.: 12/840,687

(22) Filed: Jul. 21, 2010

(51) Int. Cl.
*H04J 1/16* (2006.01)
*H04J 3/16* (2006.01)
*H04L 12/66* (2006.01)
*H04L 12/56* (2006.01)

(52) U.S. Cl. ......... 370/248; 370/356; 370/392; 370/467

(58) Field of Classification Search .................. None
See application file for complete search history.

(56) References Cited

U.S. PATENT DOCUMENTS

| | | | |
|---|---|---|---|
| 5,862,202 A | 1/1999 | Bashoura et al. | |
| 6,292,553 B1 | 9/2001 | Fellingham et al. | |
| 6,456,617 B1 | 9/2002 | Oda et al. | |
| 6,614,781 B1 | 9/2003 | Elliott et al. | |
| 6,754,181 B1 | 6/2004 | Elliott et al. | |
| 6,760,324 B1 | 7/2004 | Scott et al. | |
| 6,944,128 B2* | 9/2005 | Nichols | 370/235 |
| 7,016,343 B1 | 3/2006 | Mermel et al. | |
| 7,113,500 B1 | 9/2006 | Bollinger et al. | |
| 7,145,898 B1 | 12/2006 | Elliott | |
| 7,519,732 B2 | 4/2009 | Yeom | |
| 7,570,632 B2 | 8/2009 | Mussman et al. | |
| 7,633,929 B1 | 12/2009 | Fu et al. | |
| 7,644,181 B2 | 1/2010 | Plata Andres et al. | |
| 7,702,092 B2 | 4/2010 | Sheth et al. | |
| 2002/0188755 A1* | 12/2002 | Yeom | 709/238 |
| 2007/0110043 A1 | 5/2007 | Girard | |
| 2008/0205382 A1 | 8/2008 | Heap | |
| 2009/0046845 A1 | 2/2009 | Lewis et al. | |
| 2009/0201911 A1 | 8/2009 | Dupertuis et al. | |
| 2009/0268725 A1 | 10/2009 | Coppage | |
| 2009/0268897 A1 | 10/2009 | Coppage | |

FOREIGN PATENT DOCUMENTS

JP  2002-064566  2/2002

(Continued)

OTHER PUBLICATIONS

Buckley, Sean, "ENUM: Mapping the PSTN to IP," *Telecommunications*, Jul. 2001, 35, 7, p. 39.

(Continued)

*Primary Examiner* — Melanie Jagannathan
(74) *Attorney, Agent, or Firm* — DLA Piper LLP (US)

(57) ABSTRACT

A process for routing a call between an ingress point and an egress point is based on an identifier, such as a number, assigned to the egress point and a registry in which identifiers are stored. A routing component receives the call from the ingress point and consults the registry to determine if an entry with the identifier of the egress point being called is stored therein. If a corresponding entry exists, a delivery route for routing the call to the egress point is determined. The delivery route may be a first path to the egress point if available. If the first path is not available, one or more secondary paths are determined, where one is utilized for sending the call to the egress point. The utilized secondary path may be the most optimal path for the call based upon established preferences and call features.

15 Claims, 4 Drawing Sheets

FOREIGN PATENT DOCUMENTS

| WO | WO 00/25506 | 5/2000 |
|---|---|---|
| WO | WO 2005/081553 | 9/2005 |

OTHER PUBLICATIONS

Beijar, Nicklas, "Trip, ENUM and Number Portability," *IP Telephony Protocols, Architectures and Issues*; Feb. 2001; pp. 105-115.

Beijar, "Expanding Reach with Converged Service Interconnection," *Telcordia Digest of Technical Information*, Aug. 2008.

Benveniste, Josh, "IP Telephony Clearinghouses: Feeding the VoIP Frenzy. (Technology Information)," *Telecommunications Journal*, Nov. 2000, 34, 11, p. 95.

McElligott, Tim, "Telecordia Leverages Registry to Offer Next-Gen VoIP Routing," *Telephony*, Sep. 26, 2005.

Stastny, Richard, "ENUM—Phone Numbers on the Internet," *e & i Elektrotechnik and Informationstechnik*, Apr. 4, 2002, vol. 119, pp. 126-135.

Veeraraghavan et al., "Interworking of Addressing Schemes in an Internetwork," *IEEE Global Telecommunications Conference*, Jan. 2000, pp. 587-592.

"Telecordia Advances IP Calling Services with New VoIP Routing Registry: Breakthrough Expands New Commercial Opportunities for VoIP Carriers," *Business Wire*, Sep. 19, 2005.

"Telecordia VoIP Routing Registry Receives 2006 Frost & Sullivan Award for Product Innovation; VoIP Routing Registry, Part of Telcordia Maestro IMS Portfolio," *Business Wire*, Feb. 28, 2006.

\* cited by examiner

OPTIMIZED PATH CALL ROUTING WITH DEVICE IDENTIFIER

TECHNICAL FIELD

This disclosure relates generally to routing of calls between various devices. More specifically, this disclosure relates to enabling an optimized routing of calls between an ingress point and an egress point by utilizing a registry of stored identifiers.

BACKGROUND

One or more intermediary networks and/or exchanges is encountered in the conventional routing of calls between two devices. For example, a call is typically terminated by a service provider to the public switch telephone network (PSTN). The call is then routed based on such factors as area code and exchange, providing for the call to be terminated at a local exchange carrier (LEC) before being delivered to the end user by the end user's service provider.

There are several disadvantages associated with the call routing structure described above. First, the call routing structure is costly. As there are multiple termination points along the call route between the calling party (i.e., the ingress point) and the called party (i.e., the egress point), there is naturally a cost associated with each termination point for maintenance and profitability purposes. Reducing or eliminating one or more termination points would accordingly reduce the cost associated with a call.

A second disadvantage relates to the porting of a number associated with a device. When a user of a device enlists a service provider to provide communication services for the device, a number is typically assigned to the device to serve as an identifier. The assigned number is then "ported" with that particular service provider. If a user wishes to switch service providers, the user is typically required to either obtain a new number, or in certain circumstances, the user may be able to port their number with the new service provider, however, this process is generally an inconvenience to the user and not available in all situations in any event.

Time issues are another disadvantage with the existing call routing structure. The incorporation of one or more termination points results in a time delay for the call to be routed to the egress point. A more direct route would reduce the time delay that results from the PSTN and LEC terminations.

Further disadvantages with the existing call routing structure include poor voice quality and termination quality and the inability for devices that utilize different signaling protocols to communicate with one another.

Accordingly, there is a need and desire for an improved call routing and delivery implementation.

SUMMARY

A method is provided for routing a call between an ingress point and an egress point, where the call is initiated at the ingress point through entry of an identifier associated with the egress point. The method includes receiving the call at a network component from the ingress point and determining if the identifier associated with the egress point is stored in a registry. If the identifier associated with the egress point is stored in the registry, a delivery route for the call is determined and may be either a first path to the egress point if the first path is available, or one of one or more secondary paths to the egress point if the first path is unavailable. Upon establishing the delivery route, the call is accordingly transmitted to the egress point.

A system for routing a call between an ingress point and an egress point includes a network that interconnects various ingress points and egress points. A registry stores identifiers associated with the ingress and egress points. The system also includes a network component that is connectable to the various points of the network and that is configured for routing calls. When a call is initiated at an ingress point through entry of an identifier associated with the egress point, the call is received at the network component from the ingress point. The network component determines if the identifier associated with the egress point is stored in the registry and, if the identifier is stored in the registry, determines a delivery route for the call. The delivery route may be a first path to the egress point if the first path is available. Alternatively, the delivery route may be a secondary path to the egress point if the first path is unavailable. Once the delivery route is established, the network component transmits the call to the egress point via the delivery route.

A method is provided for routing a call between an ingress point and an egress point, where the call is initiated at the ingress point through entry of an identifier, such as an E.164 number, associated with the egress point. The method includes receiving the call at a network component from the ingress point and determining if the E.164 number associated with the egress point is stored in a registry. A delivery route for the call is determined if the E.164 number is stored in the registry. The delivery route may be either a primary path to the egress point if the primary path is available, or one of one or more secondary paths to the egress point if the primary path is unavailable. Upon establishing the delivery route, the call is transmitted to the egress point.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
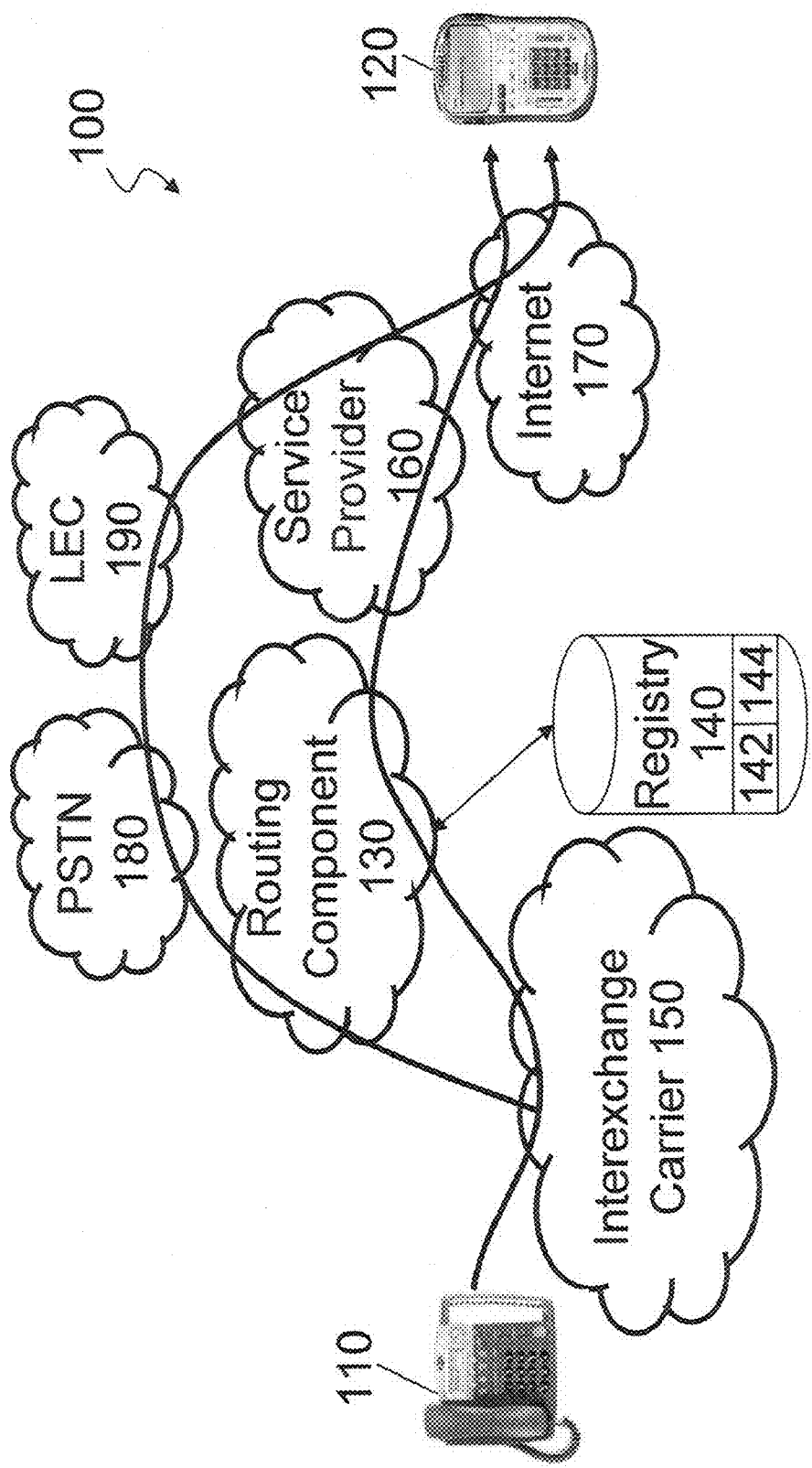
FIG. 1 illustrates a network capable of routing a call between an ingress point and an egress point according to an embodiment.

With reference to FIG. 1, a network 100, such as a Media Peering Grid™, for example, for routing calls between an ingress point 110 and an egress point 120 is illustrated. The ingress point 110 and the egress point 120 may be one of a variety of communication devices, such as, for example and without limitation, a standard telephone, a cellular phone or other wireless device, a computer, a PDA, a voice over Internet protocol (VoIP) phone, a soft phone, or the like.

The peering grid 100 includes a routing component 130 and a registry 140. In some embodiments, the registry 140 may be integral with the routing component 130. Alternatively, the registry 140 or portions of the registry 140 may be a separate component of a remote server or the like whose contents are accessible by the routing component 130. The registry 140 may be a database, such as a memory device including volatile or non-volatile memory, as example, configured to store information associated with various devices (i.e., ingress and egress points) and users.

The registry 140 may include registry entries, and with each entry including one or more of: information related to the user, information related to the user's device, the phone number or other identifier associated with the user's device (i.e., the device identifier), an Internet Protocol (IP) number associated with the user's device, settings and/or preferences established by the user and/or a service provider, or a subset thereof. Other types of information may be included in the registry entries, and such information may be periodically changed or updated, as may be desired. Moreover, the registry entries may be configured so as to not be required to include the same types or amount of information, with some entries including more or less information than other entries.

The registry 140 may be broken down into subsets or portions to differentiate between different types of registry entries. For example, the registry 140 may include a direct routing portion 142 and other routing portions 144. The registry entries stored in the direct routing portion 142 indicate corresponding devices, such as the ingress point 110 and the egress point 120, that may utilize the routing component 130 for direct routing of calls. The registry entries stored in the other routing portions 144 may include publicly-available information related to phone numbers, identifiers, and call routes for various devices. For example, such information may include routing information for the devices over the public switched telephone network (PSTN) and various local area exchanges (LECs). The information stored in the other routing portions 144 may be a copy from publicly-available databases, and which may be refreshed periodically or upon command. According to another embodiment, the other routing portions 144 may be housed separately from the registry 140 and may be accessed by the routing component 130 to obtain necessary or desired information therein.

The routing component 130 is connectable to the various devices, such as the ingress point 110 and the egress point 120 shown in FIG. 1, through IP trunks. Other connection means may also be utilized for the connection between the routing component 130 and the ingress point 110 and the egress point 120. The routing component 130 may connect directly to the ingress point 110 and the egress point 120, or the connection may be through an interexchange carrier 150, a service provider 160, and/or a network such as the Internet 170. The routing component 130 is also connectable to other components not shown in FIG. 1, such as various exchanges, devices, and networks, such as the PSTN and/or peering grids. The peering grid 100 may include the various components and peering grids between the ingress point 110 and the egress point 120, such as the interexchange carrier 150, the routing component 130, the service provider 160, and the Internet 170.

The routing component 130 may be, according to various embodiments, a processing element embodied as a processor, a co-processor, a controller, or various other processing means or devices including integrated circuits. The routing component 130 may include communication interface elements for communication with other devices and components. The communication interface elements may be a device or means embodied in hardware, software, or a combination that is configured to receive and transmit data between the routing component 130 and the other devices and components of the peering grid 100. The routing component 130 may also include a memory element, including volatile or non-volatile memory, for storing information, instructions, or the like to enable the routing component 130 to perform various functions. Alternatively or additionally, the routing component 130 may communicate with remote memory elements stored on a server or the like.

According to an exemplary embodiment, the routing component 130 is configured to receive a call from the ingress point 110. The call is initiated at the ingress point 110 through entry of an identifier associated with the desired egress point, such as the egress point 120. The call may include information related to one or both of the ingress point 110 and the egress point 120. For example, the call may include a number associated with each point 110 and 120, a registry identifier for one or each point 110 and 120, and/or the type of call (i.e., voice, data, video, etc.). The call may be received at the routing component 130 directly from the ingress point 110 or from the interexchange carrier 150 associated with the ingress point 110.

An identifier or number associated with the egress point 120 may contain any desired length of digits. As just one example, the identifier may comprise an E.164 number, which is an international standardized numbering plan used in voice and data networks that defines the numbering format, which typically varies by geographic region. For example, in the United States, an E.164 number is a 10-digit number, although as should be understood, the E.164 number may comprise a wide range of digits depending on the region. For instance, currently E.164 numbers may include up to 15 digits and may require a prefix for international calls. As should be understood, however, the numbers or identifiers associated with the ingress point 110 and the egress point 120 may follow other available standards other than E.164 as well where desired, or alternatively, the number or identifier may not follow any standard and just comprise a desired length of digits.

Upon receipt of the call, the routing component 130 consults the registry 140 to determine if the identifier being called is stored therein. Consulting the registry 140 may include querying the registry 140 to determine if a registry entry exists for the identifier being called. According to an embodiment, the routing component 130 may initially query the direct routing portion 142 of the registry 140 to determine if the identifier being called is stored in the direct routing portion 142. According to an additional embodiment, the routing component 130 may query the direct routing portion 142 only if the identifier or number of the device initiating the call (i.e., the ingress point 110) is stored in the direct routing portion 142 of the registry 140.

The routing component 130 may then determine a delivery route for the call, which may, according to an embodiment, be the optimal route available at the time the call is received at the routing component 130. The delivery route may be a first path to the egress point 120 if the identifier or number is stored in the direct routing portion 142 of the registry 140 and if the first path is available. A path may be deemed unavailable if the path is unable to carry or transmit calls or messages for a variety of reasons, such as but not limited to an excess of traffic on the path, maintenance being performed on the path, or an indication of transmission problems occurring on the path, for example. The first path may be a primary or direct path to the egress point 120. The direct path may be a path from the routing component 130 directly to the egress point 120, or may be a path to the service provider 160 of the egress point 120 via the Internet 170 to the egress point 120.

If the direct path is not available, then the routing component 130 may determine a secondary path to the egress point 120 for the call. The secondary path may be a path through a PSTN 180 and LEC 190 associated with the egress point 120. For example, the traditional Signaling System No. 7 (SS7) protocols may be utilized for establishing the call between the ingress point 110 and the egress point 120. Other routing options are also possible, such as, for example, routing through multiple exchange carriers and/or networks and peering grids. The routing component 130 may utilize the most optimal route of the various possible secondary paths. For example, the most optimal route may be the path with the least number of termination points, the path with the best transport characteristics for the particular type of call being handled, or the path that is the least expensive route. A most optimal route may be different for each device and may be defined for each device according to user or service provider preferences or requirements, for example. For instance, a service provider may define the most optimal route for the devices it serves as the least expensive route, and this definition may accordingly be stored in the registry 140 with the registry entries for the corresponding devices. The secondary paths may be determined by accessing registry 140, including the other routing portions 144 of the registry 140.

Once the delivery route is established, the routing component 130 operates to transmit the call to the egress point 120 based on the determined delivery route.

Figure 2:
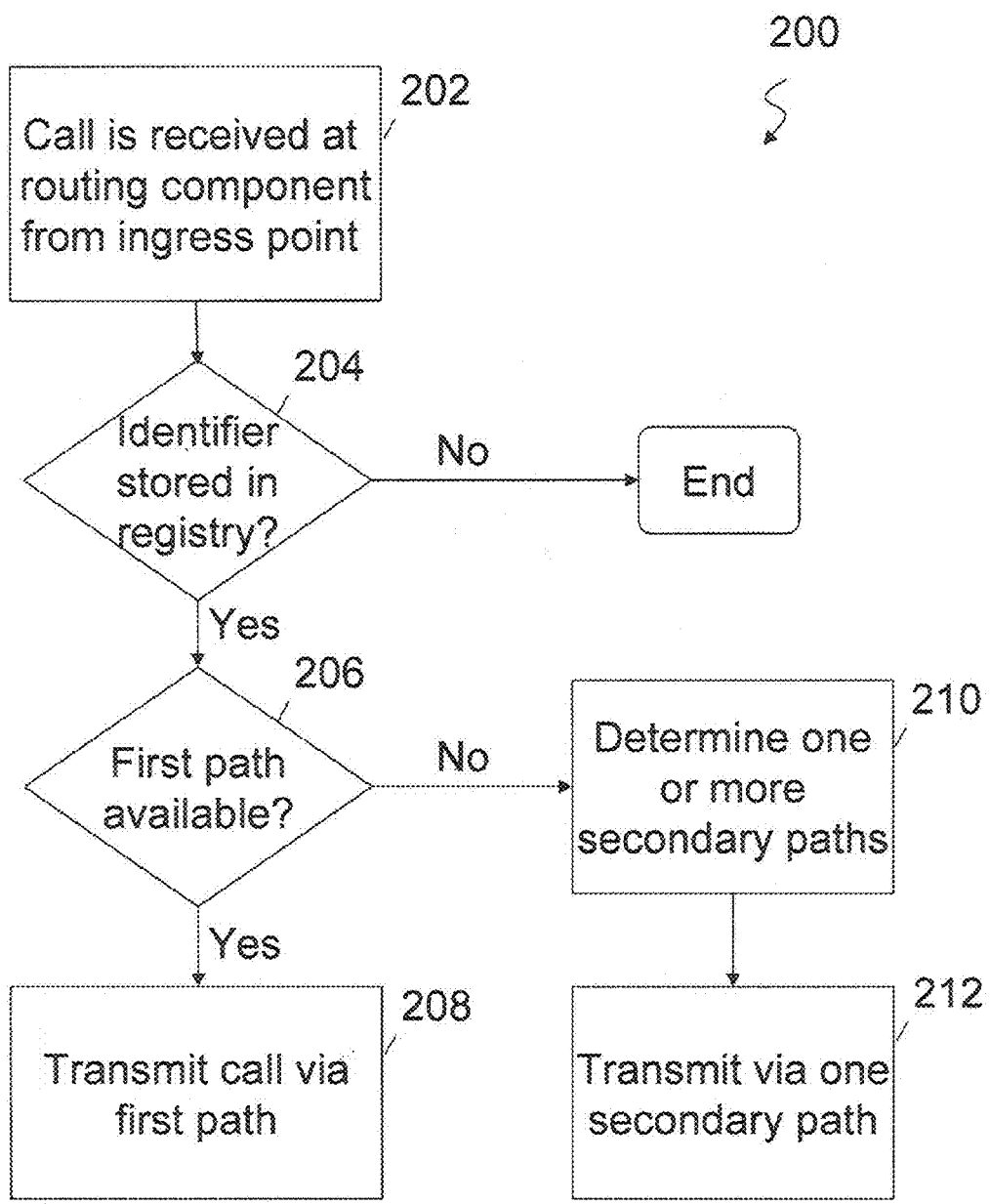
FIG. 2 illustrates a flow chart of a method for routing a call between an ingress point and an egress point according to an embodiment.

With reference to FIG. 2, a flowchart of a method 200 for routing a call between an ingress point and an egress point, such as the points 110 and 120, respectively, is illustrated. One or more computing devices or other suitable devices that include a memory for storing instructions and a processor for executing the instructions may be utilized to perform the steps of the method 200.

At 202, the call is received at the routing component 130 from the ingress point 110. The call may be initiated at the ingress point 110 through entry of an identifier, such as a number, associated with the desired egress point 120.

At 204, a determination is made to establish if the identifier is stored in a registry, such as the registry 140. In particular, the determination may include determining if the identifier is stored in the direct routing portion 142. If the identifier is not stored in the registry 140, then the process ends. At this point, the call may be rerouted to a PSTN, other peering grid, or a component to be routed according to another call routing procedure.

At 206, if the identifier is stored in the direct routing portion 142 of the registry 140, a subsequent determination is made to establish if a first path to the egress point 120 is available. In one exemplary embodiment, the determination as to the availability of the path is established through a "service unavailable" message. If the call is transmitted over the path and a message relating to the availability of the path is not returned, then the path is deemed to be available. If, on the other hand, the call is sent back, then the path is deemed to be unavailable. The service unavailable message may be a session initiation protocol (SIP) response code 503, for example.

At 208, if the identifier is stored in the direct routing portion 142 and the first path is available, then the call is transmitted to the egress point 120 via the first path.

If the first path is not available, at 210, one or more secondary paths are determined by consulting the registry 140. At 212, the call is transmitted via one of the secondary paths. The secondary path that is utilized for the call may be the path determined to be the most optimal delivery route for the call out of various secondary path options. The optimal delivery route may be established according to user or service provider preference or requirements and may be stored as part of the registry entry for the corresponding device (i.e., egress point 120). If an optimal or preferred delivery route is not established for a particular device, the routing component 130 may randomly select a secondary path, or the selection of a secondary path may include considerations related to time and cost, for example. According to an embodiment, the various paths may be ranked sequentially according to route preference. The routing component 130 may attempt each path in sequential order until one is found to be available for the transmission of the call.

Prior to transmitting the call, a determination may be made as to a signaling protocol utilized by the ingress point 110 and a signaling protocol utilized by the egress point 120. Different types of devices may employ different signaling protocols that are conducive to the applications and operation of the device. If a call is being transmitted between two devices (i.e., the ingress point 110 and the egress point 120) it may be necessary to transcode, or convert, the call to a format that is compatible with the destination device (i.e., the egress point 120). Thus, after determining the signaling protocol of each point, the call may be converted to a format compatible with the signaling protocol of the egress point if the egress point signaling protocol differs from that of the ingress point. Examples of signaling protocols may include, but are not limited to, IP, time-division multiplexing (TDM), and SS7. The signaling protocol of each point may be stored in the registry 140 as part of a corresponding registry entry, and the determination of the signaling protocol may be achieved by querying or accessing the registry 140 to obtain the protocol information.

Figure 3:
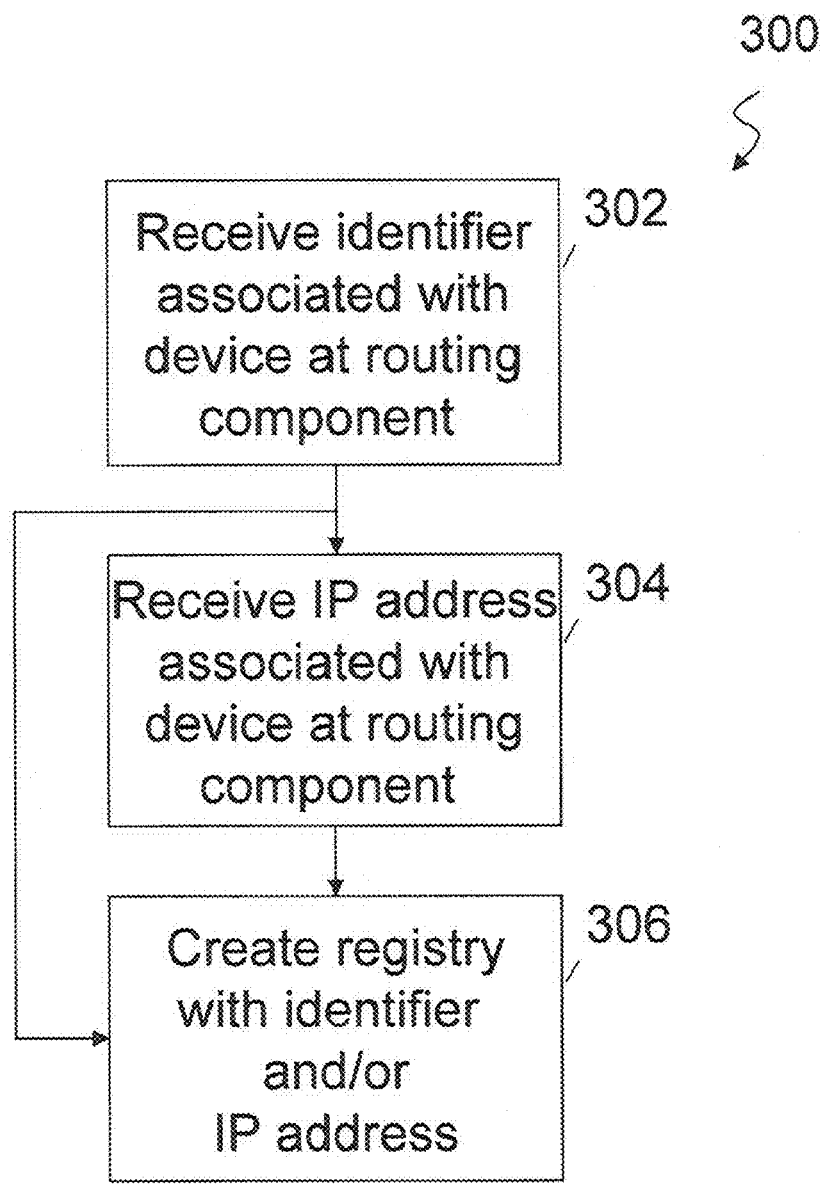
FIG. 3 illustrates a flowchart of a method for establishing a registry entry according to an embodiment.

With reference to FIG. 3, a flowchart of a method 300 for establishing a registry entry is illustrated. One or more computing devices or any suitable devices that include a memory for storing instructions and a processor for executing the instructions may be utilized to perform the steps of the method 300.

The establishing of a registry entry may be done to utilize the direct path routing capabilities provided by the routing component 130. The registry entry may be created by a user of a device, such as the ingress point 110 or the egress point 120, through a registration process, such as by an online registration, by facsimile, by telephone, by email, by regular mail, or by an automated procedure, as examples. In some embodiments, the device may be automatically registered with a registry entry upon purchase by the user or upon agreement by a service provider. For example, a particular service provider, such as the service provider 160, may wish to utilize the capabilities of the routing component 130 and may provide the required information for devices under the administration of the service provider.

At 302, once a user and/or service provider has indicated a willingness to create a registry entry, an identifier associated with a device, such as the egress point 120, may be received by the routing component 130. At 304, an internet protocol (IP) address associated with the device may received by the routing component if the device is IP-enabled and has an IP address. The receipt of an identifier, at 302, may be bypassed in the establishing of a registry entry, in which case the receipt of an IP address may begin the process of establishing a registry entry.

At 306, a registry entry including the identifier and/or the IP address (if the device is IP-enabled and has an IP address), is created, which may occur when the routing component 130 provides the information to the registry 140. The registry entry is then stored (i.e., saved) in the registry 140 for subsequent access thereto. For example, when a call is being placed via the routing component 130, the registry 140 is searched or otherwise accessed to determine if a stored registry entry includes the identifier and/or IP address associated with an egress point attempting to be called. The registry entry may be stored in a corresponding portion of the registry 140. For example, to enable direct routing via the routing component 130, the registry entry may be stored in the direct routing portion 142.

Figure 4:
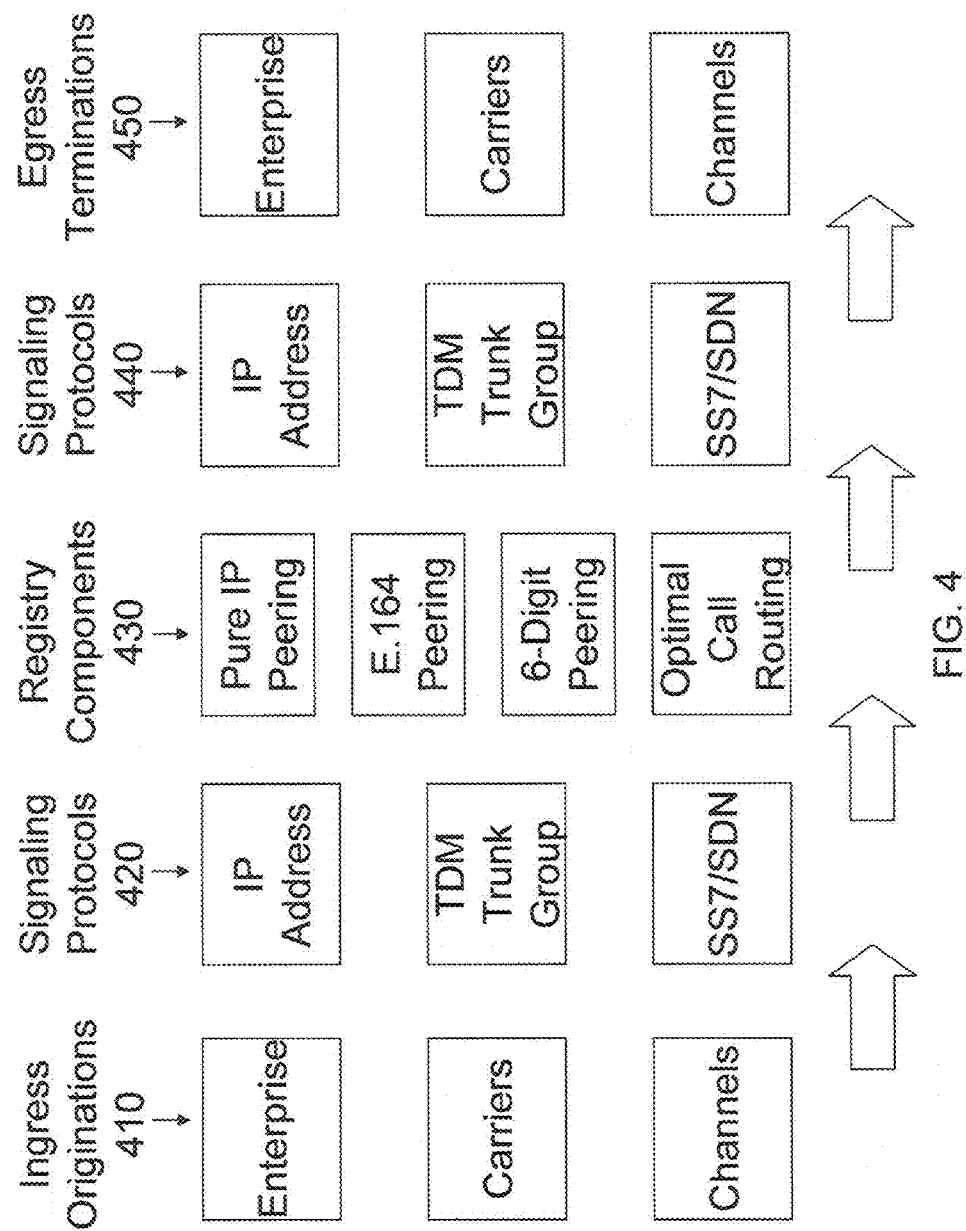
FIG. 4 illustrates a call processing matrix according to an embodiment.

With reference to FIG. 4, a call processing matrix 400 is illustrated. The matrix 400 is a call processing diagram that indicates the capabilities of the peering grid 100 with the routing component 130 and the registry 140. As shown in FIG. 4, different types of ingress origination points 410 and egress termination points 450 may effectively utilize the peering grid and its routing capabilities. For example, the ingress origination points 410 and the egress termination points 450 may be an enterprise, a carrier, or a channel. However, the peering grid and routing capabilities are not limited to these types of origination and termination points, and other types may be employed in the peering grid 100.

Various signaling protocols 420 and 440 may be employed by the various ingress origination points 410 and the egress termination points 450 without limiting the ability of the origination points 410 and termination points 420 to utilize the routing capabilities of the peering grid 100. IP address, TDM trunk group, and SS7/ISDN are shown as examples of signaling protocols according to an embodiment; however, the signaling protocols 420 and 440 are not so limited and other protocols may be utilized.

The call processing matrix 400 further includes a registry component 430, such as the registry 140 described above with respect to the peering grid 100 of FIG. 1. The registry component 430 may include information related to various types of call routing and delivery mechanisms. The different portions of the registry component 430 may signify the different routing capabilities for the corresponding ingress and egress points. For example, the pure IP peering portion of the registry component 430 provides the IP addresses for devices that are capable of transmitting and receiving IP traffic. The E.164 peering portion refers to the registry entries that include E.164 numbers for direct call routing, although as noted above, any desired length of digits may be utilized, including numbers other than E.164 numbers where desired; for example, a 10-digit number may be utilized in one exemplary embodiment. 6-digit peering refers to the registry entries for devices whose calls are routed through the PSTN and LECs. Similar to the E.164 peering portion, however, any alternative desired length of digits may be utilized for the 6-digit peering portion where desired. The optimal call routing portion refers to the registry entries that may include information to achieve optimal or preferred call routing between devices. Although not shown, registry component 430 may include additional portions to provide additional routing functions or capabilities where desired.

Devices may have registry entries for more than one portion of the registry component 430. For example, a device may be connected to the routing component 130 for direct call routing, but it is possible that the direct routing path is not always available due to being unable to carry or transmit calls or messages for a variety of reasons, such as an excess of traffic on the path, outages, spikes, maintenance being performed on the path, problems with the number (i.e. a number has been ported away to another user), or an indication of transmission problems occurring on the path, for example. In this situation, the routing component 130 may consult other portions of the registry component 130 to determine other routing options. For example, the 6-digit peering portion may provide the information necessary for routing via the PSTN and LEC responsible for the egress point.

Thus, the call processing matrix 400 illustrates a mapping for a call to be routed through the peering grid 100 shown in FIG. 1. In this example, an optimal call routing portion is illustrated in FIG. 4 for accommodating the mapping for a call. The mapping may include signal protocol conversion if necessary and route determination based on the registry component 430. The mapping provides for every call to be transmitted between origination and termination points of the peering grid 100 through one of multiple paths. The optimal call routing portion may be configured to provide certain mapping schemes for a call to follow, for example, depending on the type of call and/or certain defined preferences or requirements. For illustration, in one embodiment, the optimal call routing portion may be configured so that E.164 peering will provide the most efficient routing according to defined parameters, such as from a cost, time, distance and/or quality perspective, as examples. For instance, from a cost perspective, the mapping can facilitate a call path to bypass certain components and/or networks or peering grids, etc., where desired, so that charges, fees or other costs can either be minimized or eliminated altogether, for instance, by bypassing or limiting use of the PSTN and/or LEC. Further, where E.164 peering may not be available, then the optimal call routing portion may be configured so as to provide one or more alternative routings for a call, for example, by utilizing 6-digit peering. In this manner, the path utilized can be the most direct path or the path meeting established requirements if the most direct path is unavailable. Thus, the mapping utilized by the peering grid 100 is both cost and time effective as the most direct and/or cost effective route may be used when available between devices. Moreover, through the mapping implementation the peering grid 100 is able to handle any type of data by its ability to transcode the data according to the destination device, thus providing for communication between different types of devices. The optimal call routing portion may provide such mapping functionality through the use of hardware, software or combination of the two.

Yet another advantage associated with the mapping functionality of the peering grid 100 is the ability of a user to utilize the functionality without switching service providers or device identifiers (i.e., numbers). A user may provide their device identifier to be included in the registry 140 so that the optimized path call routing is employed for their device regardless of the service provider. Thus, the user is not burdened with the responsibility and inconvenience of switching service providers and porting their device number from one service provider to another.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method for routing a call between an ingress point and an egress point, the call being initiated at the ingress point through entry of an identifier associated with the egress point, the method comprising:
   receiving the call at a routing component from the ingress point;

determining at the routing component if the identifier associated with the egress point is stored in a registry, wherein the egress point is a destination for the call, and wherein storage in the registry indicates registration for direct call routing to the egress point;

if the identifier is stored in the registry, determining at the routing component a delivery route for the call, wherein the delivery route comprises (i) a first path to the egress point if the first path is available, wherein the first path is a dedicated connection to the egress point (ii) a second path to the egress point if the first path is unavailable, wherein the second path is a connection to a carrier associated with the egress point, and (iii) a third path to the egress point if the first and second paths are unavailable, wherein the third path is a connection through a public switched telephone network and local exchange carrier associated with the egress point, wherein a path is deemed available based on its ability to carry the call along the path and unavailable based on its inability to carry the call along the path; and transmitting the call to the egress point based upon the determined delivery route.

2. The method of claim 1, wherein receiving the call at a routing component from the ingress point comprises receiving the call directly from the ingress point or from an interexchange carrier associated with the ingress point.

3. The method of claim 1, further comprising:

receiving at least one of an identifier and an interne protocol (IP) address associated with an egress point;

creating a registry entry comprising the at least one of the identifier and the IP address; and storing the registry entry in the registry.

4. The method of claim 3, wherein determining at the routing component if the identifier associated with the egress point is stored in a registry comprises searching the registry to determine if a stored registry entry comprises the identifier.

5. The method of claim 1, further comprising:

determining a signaling protocol utilized by the ingress point and a signaling protocol utilized by the egress point; and converting the call to a format compatible with the signaling protocol of the egress point if the egress point signaling protocol differs from that of the ingress point.

6. The method of claim 1, wherein the identifier comprises a E.164 number.

7. The method of claim 1, wherein determining at the routing component if the identifier associated with the egress point is stored in a registry is performed if an identifier associated with the ingress point is stored in the registry.

8. A system for routing a call between an ingress point and an egress point, the call being initiated at the ingress point through entry of an identifier associated with the egress point, the system comprising:

a network that interconnects ingress points and egress points; a registry for storing identifiers, each identifier associated with a corresponding ingress point or egress point, wherein the egress point is a destination for the call, and wherein storage in the registry indicates registration for direct call routing to the corresponding egress point; and a routing circuit connectable to the ingress points and the egress points, the routing circuit configured to:

receive the call from the ingress point; determine if the identifier associated with the egress point is stored in the registry; if the identifier associated with the egress point is stored in the registry, determine a delivery route for the call, wherein the delivery route comprises (i) a first path to the egress point if the first path is available, wherein the first path is a dedicated connection to the egress point (ii) a second path to the egress point if the first path is unavailable, wherein the second path is a connection to a carrier associated with the egress point, and (iii) a third path to the egress point if the first and second paths are unavailable, wherein the third path is a connection through a public switched telephone network and local exchange carrier associated with the egress point, wherein a path is deemed available based on its ability to carry the call along the path and unavailable based on its inability to carry the call along the path; and transmit the call to the egress point based upon the determined delivery route.

9. The system of claim 8, wherein the routing circuit to receive the call from the ingress point comprises the routing circuit configured to receive the call directly from the ingress point or from an interexchange carrier associated with the ingress point.

10. The system of claim 8, wherein the routing circuit is further configured to: receive at least one of an identifier and an internet protocol (IP) addressed associated with an egress point;

create a registry entry comprising the at least one of the identifier and the IP address;

and store the registry entry in the registry.

11. The system of claim 10, wherein the routing circuit configured to determine if the identifier associated with the egress point is stored in a registry comprises the routing circuit configured to search the registry to determine if a stored registry entry comprises the identifier.

12. The system of claim 8, wherein the routing circuit is further configured to:

determine a signaling protocol utilized by the ingress point and a signaling protocol utilized by the egress point; and convert the call to a format compatible with the signaling protocol of the egress point if the egress point signaling protocol differs from that of the ingress point.

13. The system of claim 8, wherein the identifier comprises a E.164 number.

14. The system of claim 8, wherein the routing circuit determines if the identifier associated with the egress point is stored in the registry if an identifier associated with the ingress point is stored in the registry.

15. A method for routing a call between an ingress point and an egress point, the call being initiated at the ingress point through entry of an E.164 number associated with the egress point, the method comprising:

receiving the call at a routing component from the ingress point;

determining at the routing component if the number associated with the egress point is stored in a registry, wherein the egress point is a destination for the call, and wherein storage in the registry indicates registration for direct call routing to the egress point;

if the number associated with the egress point is stored in the registry, determining at the routing component a delivery route for the call, wherein the delivery route comprises (i) a primary path to the egress point if the primary path is available, wherein the primary path is a dedicated connection to the egress point and (ii) at least one secondary path to the egress point if the primary path is unavailable, wherein a first secondary path comprises a connection to a carrier associated with the egress point, wherein a second secondary path comprises a connection through a public switched telephone network and local exchange carrier associated with the egress point, and wherein the second secondary path is utilized upon a determination of unavailability of the first secondary path, wherein a path is deemed available based on its ability to carry the call along the path and unavailable based on its inability to carry the call along the path; and transmitting the call to the egress point based upon the determined delivery route.

* * * * *